May 12, 1953    L. B. FORMAN    2,638,516
VEHICLE SWITCHING DEVICE
Filed Feb. 20, 1951    2 Sheets-Sheet 1

INVENTOR
Louis B. Forman.
BY
Harness and Harris
ATTORNEYS.

May 12, 1953      L. B. FORMAN      2,638,516
VEHICLE SWITCHING DEVICE
Filed Feb. 20, 1951      2 Sheets-Sheet 2
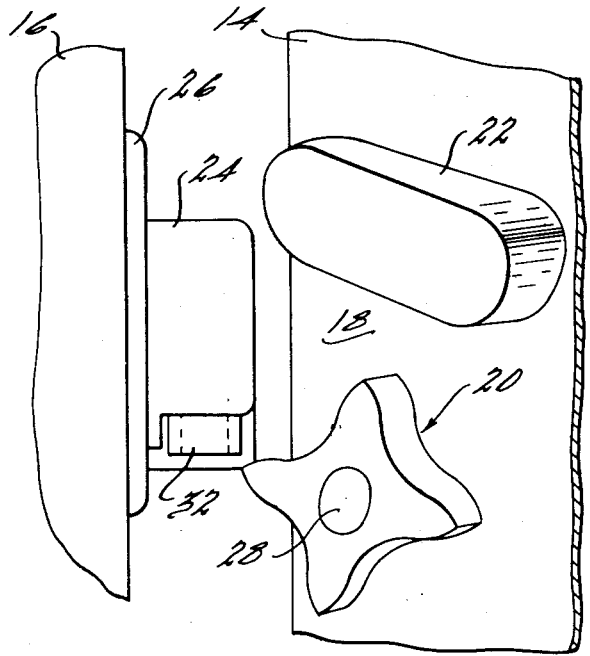
Fig. 2.
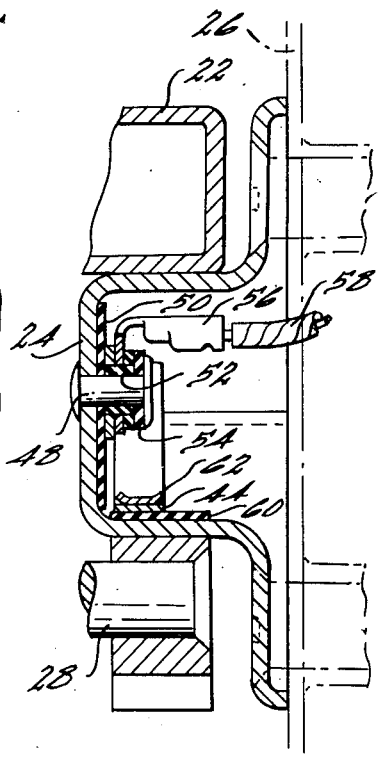
Fig. 4.
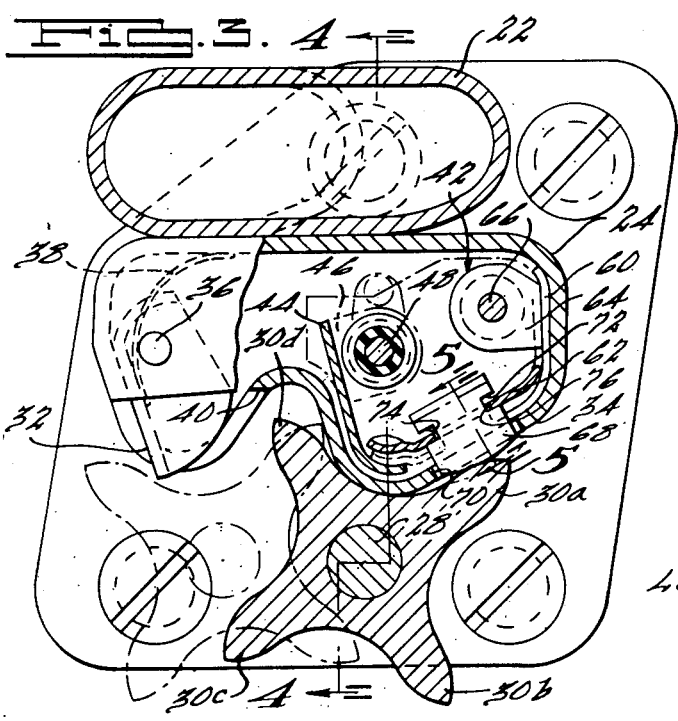
Fig. 3.
Fig. 5.
INVENTOR.
Louis B. Forman.
BY
Harness and Harris
ATTORNEYS.

UNITED STATES PATENT OFFICE 2,638,516

VEHICLE SWITCHING DEVICE

Louis B. Forman, Detroit, Mich., assignor to Chrysler Corporation, Highland Park, Mich., a corporation of Delaware Application February 20, 1951, Serial No. 211,839

5 Claims. (Cl. 200—55)

My invention relates to vehicle electrical systems and has particular reference to a new and novel type of switching means for a vehicle electrical circuit.

A principal object of my invention is to provide a vehicle with a novel type of switching arrangement which cooperates with one of the vehicle doors.

Another object of my invention is to provide a new switching arrangement which not only closes an electrical circuit when a door is closed but also indicates if the door is completely and tightly closed.

A further object of my invention is to provide a switching device which is simple in design as well as economical to manufacture.

The invention deals generally with the conventional type of vehicle rotary lock mechanism in combination with a switch which, for example, controls the dome light circuit within the vehicle.

Other objects and advantages will become more apparent from the following description of one embodiment of my invention, reference being had to the accompanying drawings in which:

Fig. 2 is an elevational view partly in perspective illustrating the door latch mechanism utilized in my invention.

Fig. 3 is a side elevational view of the door latch mechanism having portions broken away and in section to more clearly show the invention.

Fig. 4 is a sectional view taken on the line 4—4 of Fig. 3.

Fig. 5 is a sectional view taken on the line 5—5 of Fig. 3.

Figure 1:
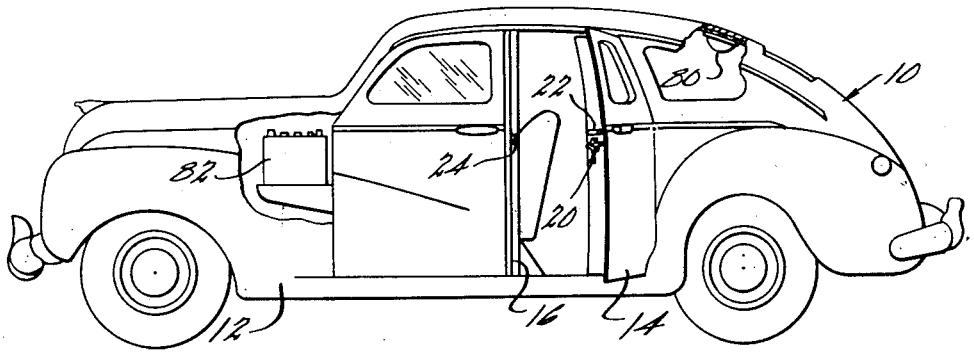
Fig. 1 is a side elevational view of a motor vehicle having portions broken away to more clearly illustrate the invention.

Referring to the drawings, in Fig. 1 I have shown a motor vehicle, generally designated by the numeral 10, including a body portion 12, having a door 14 hinged thereto. The body portion is also provided with a center post 16 which supports the door 14 when it is closed.

The latch mechanism which I have shown in the drawings is of a conventional type and is described and illustrated in Patent No. 2,195,179, issued to Rollo Marple on March 26, 1940. A full description and showing of this latch device may be had by referring to this aforementioned patent.

The improved device which is secured within the door 14 of the vehicle comprises generally a casing 18, a rotary bolt 20 and a dove tail 22 disposed above the bolt 20. A keeper 24 is suitably secured to the center post 16 by means of a bracket 26. The bolt 24 is rotatably journalled in the lock casing upon a trunnion or pin 28 and is formed to provide a keeper engaging portion 30 which projects externally of the lock casing 18 for cooperation with the keeper 24. The outer portion 30 of the bolt 20 is formed to provide a plurality of radially extending, equiangularly spaced keeper engaging teeth 30a, 30b, 30c and 30d, any one of which is effective to cooperate with either the safety catch 32 associated with the keeper or the keeper surface 34 associated therewith, to hold the door 14 in either the partially closed or safety position, or the completely closed position, respectively. It will be appreciated that the annular spaces between the teeth 30a, 30b, 30c and 30d, relative to the spacing between the safety catch 32 and the keeper surface 34 is such that the bolt 20 can roll over or across the keeper in a manner similar to the cooperation between a gear and a rack. An illustration and description of the portion of the bolt 20 disposed within the door 14 may be had in the aforementioned Patent No. 2,195,179.

Referring now more particularly to Fig. 3, the keeper 24 comprises a body which may be and preferably is formed as a relatively heavy metal stamping, and which is formed to define the previously mentioned bolt engaging surface 34. The previously mentioned safety catch 32 may be formed as a die casting, or the like, and is pivotally supported upon a pin 36, which extends between ends supported in the opposite side wall of the keeper 24. A spring 38 is connected between the catch 32 and the keeper body and continuously urges the safety catch 32 to the active position shown in Fig. 3. It will be noted that the otherwise continuous body of the keeper 24 is cut away as indicated at 40 to afford a slot or opening through which the safety catch may move from an active position shown in Fig. 3 to a retired position.

My invention relates to the combination of the aforementioned and described latch device and a switching device generally designated by the numeral 42. As more clearly shown in Figs. 3, 4 and 5, the switching device comprises a contact member 44 formed of flat metallic material disposed within the keeper and having an ear or flange 46 integrally connected at one end and extending outwardly therefrom. The ear 46 is held in place by a rivet 48 which extends through an outer wall of the keeper and which is insulated from the keeper by a sheet of insulating material 50, a collar 52 of non-conducting material and non-conducting washers 54. The flange 46 is thus insulated from the rivet 48 but abuts a terminal lug 56 which is also disposed around the rivet 48. The terminal lug 56 is soldered to a wire 58 which extends outwardly of the keeper into the vehicle. The contact 44 is insulated from the keeper by a sheet 60 of non-conducting material which extends the entire length of the surface 34. As more clearly seen in Fig. 3, a second contact member 62 of flat metallic material is similarly provided with a flange 64 which is carried by a rivet 66 in the identically same manner as the flange 46 is carried by the rivet 48. The rivet 66 is secured to the keeper wall in the same manner as rivet 48 is secured to the wall. The contact member 62 extends substantially the length of the surface 34 and is provided with sufficient resiliency to be urged into engagement with the contact member 44. This position of the contact member 62 is illustrated by the dashed lines in Fig. 3. The contact member 62 is similarly insulated from the keeper by the sheet 60 of non-conducting material. To effect opening and closing of the contact members 44 and 62, I have provided a switch element 68 which is slidably disposed within an opening or slot 70 in the surface 34 of the keeper. The element 68 is composed of non-conducting sheet-like material such as Bakelite or plastic and is provided with opposed notches 72 and 74, the innermost surfaces thereof being received within an opening or slot 76 disposed in the contact member 62. The non-conducting sheet 60 is similarly provided with an opening to allow the passage of the element 68 therethrough. It will be seen, therefore, that due to the notches 72 and 74, the switch element 68 is connected to the contact member 62 and any movement of the element 68 will in turn move or pivot the contact member 62.

Figure 6:
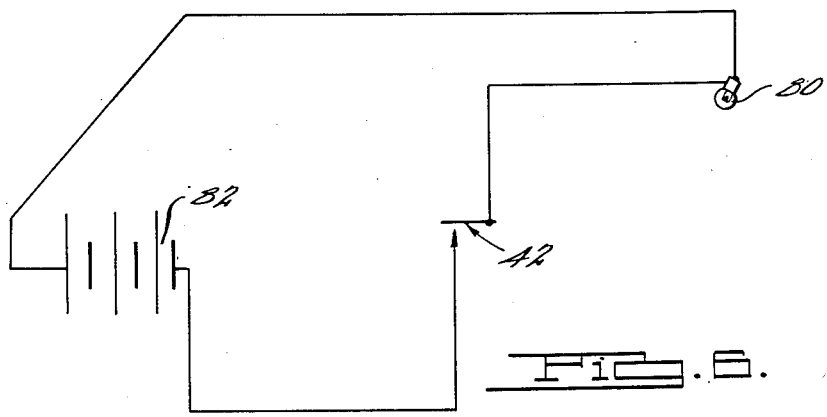
Fig. 6 is a schematic drawing of the electrical circuit utilized in my invention.

In operation, when the vehicle door 14 is open and the bolt 20 is no longer engaged with the keeper 24, the switch element 68 extends outwardly of the opening 70 in the surface 34 of the keeper to an extent that the contact element 62, due to its inherent resiliency, engages the contact element 44 and as viewed in the schematic diagram of Fig. 6, the dome lamp 80 within the vehicle is energized since the switch 42 is in series with the dome lamp 80 and the vehicle battery 82. When the vehicle door 14 is partially closed or as shown by the dashed lines of the bolt 20 in Fig. 3, the contact elements 44 and 62 are still engaged and even though the door is partially closed, the dome lamp 80 is still energized. When, however, the door 14 is completely closed, and the bolt 20 is in the position as shown by the solid lines, in Fig. 3, the tooth 30a of the bolt engages the switch element 68 and slidably urges it inwardly of the keeper thereby raising the contact member 62 off of the contact member 44 and breaking the electrical circuit which energizes the dome light.

It will be seen, therefore, that my improved combination not only simplifies the location of the dome light switch but also effectively indicates to the driver of the vehicle when the rear door with which the switch is associated is completely closed.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a vehicle body having a swingable door, the combination comprising a rotatable latch bolt and a keeper respectively secured to said door and body, said keeper having first and second abutments defining first and second stations for engaging said bolt when said door is in a partially closed and a completely closed position, respectively, and switch means for controlling an electrical circuit within said vehicle having a portion extending outwardly from said second abutment and engageable with said bolt when said bolt is in said second station.

2. In a vehicle body having a swingable door, the combination comprising a rotatable latch bolt and keeper respectively secured to said door and body, said keeper having first and second abutments defining first and second stations, for receiving said bolt when said door is in a partially closed and a completely closed position, respectively, said second abutment having a surface provided with an opening therein, and switch means for controlling an electrical circuit within the vehicle comprising contact members disposed within said keeper for opening and closing said circuit and an element operatively connected to one of said contact members and slidably disposed within said opening, said rotatable latch bolt engaging said element and opening said circuit when the bolt engages said surface and said door is in said completely closed position.

3. In a vehicle body having a swingable door, the combination comprising a rotatable latch bolt and keeper respectively secured to said door and body, said keeper having first and second abutments defining first and second stations, for receiving said bolt when said door is in a partially closed and a completely closed position, respectively, said second abutment having a surface provided with an opening therein, and switch means for controlling an electrical circuit within the vehicle comprising contact members disposed within said keeper for opening and closing said circuit, means anchoring said contact members, means insulating said contact members from said anchoring means, and an element operatively connected to one of said contact members and slidably disposed within said opening, said rotatable latch bolt engaging said element and opening said circuit when the door is in said completely closed position.

4. In a vehicle body having a swingable door, the combination comprising a rotatable latch bolt and keeper respectively secured to said door and body, said keeper having first and second abutments defining first and second stations, for receiving said bolt when said door is in a partially closed and a completely closed position, respectively, said second abutment having a surface provided with an opening therein, and switch means for controlling an electrical circuit within the vehicle comprising first and second contact members disposed within said keeper for opening and closing said circuit, one of said contact members having an opening therein, and a switch element having a notched portion disposed within the opening in said one contact member and slidably disposed within the opening in said surface, said rotatable latch bolt engaging said switch element and opening said circuit when the door is in said completely closed position.

5. In a vehicle body having a swingable door, the combination comprising a rotatable latch bolt and keeper respectively secured to said door and body, said keeper having first and second abutments having first and second stations, for receiving said bolt when said door is in a partially closed and a completely closed position, respectively, said second abutment having a surface provided with an opening therein, and switch means for controlling an electrical circuit within the vehicle comprising first and second contact members disposed within said keeper for opening and closing said circuit, one of said contact members having an opening therein, means anchoring said contact members to said keeper, means electrically insulating said contact members from said anchoring means and from said keeper, and a switch element having a notched portion disposed within the opening in said one contact member and slidably disposed within the opening in said surface, said rotatable latch bolt engaging said switch element and opening said circuit when the door is in said completely closed position.

LOUIS B. FORMAN.

References Cited in the file of this patent

UNITED STATES PATENTS

| Number | Name | Date |
| --- | --- | --- |
| 2,193,488 | Morley | Mar. 12, 1940 |
| 2,467,815 | Curtiss | Apr. 19, 1949 |